United States Patent
Matsuo et al.

(10) Patent No.: US 7,503,123 B2
(45) Date of Patent: Mar. 17, 2009

(54) SURVEYING APPARATUS

(75) Inventors: Shunji Matsuo, Tokyo (JP); Homu Takayama, Saitama (JP); Takanori Yachi, Tokyo (JP); Masatoshi Sakurai, Saitama (JP)

(73) Assignee: PENTAX Industrial Instruments Co., Ltd., Tokyo (JP)

( * ) Notice: Subject to any disclaimer, the term of this patent is extended or adjusted under 35 U.S.C. 154(b) by 99 days.

(21) Appl. No.: 11/772,476

(22) Filed: Jul. 2, 2007

(65) Prior Publication Data

US 2008/0120855 A1   May 29, 2008

(30) Foreign Application Priority Data

Jul. 3, 2006   (JP)   ............................. 2006-183301

(51) Int. Cl.
*G01C 15/00* (2006.01)
*G01C 1/04* (2006.01)

(52) U.S. Cl. ...................................................... 33/290

(58) Field of Classification Search .................. 33/290, 33/291, 292
See application file for complete search history.

(56) References Cited

U.S. PATENT DOCUMENTS

| | | | | |
|---|---|---|---|---|
| 5,692,061 | A * | 11/1997 | Sasada et al. ................ | 382/106 |
| 6,559,931 | B2 * | 5/2003 | Kawamura et al. .......... | 356/4.01 |
| 6,771,303 | B2 * | 8/2004 | Zhang et al. ............... | 348/14.16 |
| 6,873,407 | B2 * | 3/2005 | Vogel ....................... | 356/141.4 |
| 2003/0048438 | A1 * | 3/2003 | Kawamura et al. ......... | 356/141.1 |
| 2003/0160757 | A1 * | 8/2003 | Shirai et al. ................. | 345/156 |
| 2004/0004706 | A1 * | 1/2004 | Uezono et al. ................. | 356/3 |
| 2005/0168727 | A1 * | 8/2005 | Vogel .......................... | 356/138 |
| 2006/0192946 | A1 * | 8/2006 | Walser ......................... | 356/144 |
| 2008/0018880 | A1 * | 1/2008 | Matsuo et al. .............. | 356/4.01 |
| 2008/0069406 | A1 * | 3/2008 | Matsuo et al. .............. | 382/106 |
| 2008/0120856 | A1 * | 5/2008 | Matsuo et al. ................ | 33/299 |
| 2008/0123903 | A1 * | 5/2008 | Matsuo et al. .............. | 382/106 |

FOREIGN PATENT DOCUMENTS

| | | | |
|---|---|---|---|
| EP | 997704 | A1 * | 5/2000 |
| JP | 6 137857 | | 5/1994 |
| JP | 06167332 | A * | 6/1994 |
| JP | 11 337336 | | 12/1999 |

(Continued)

OTHER PUBLICATIONS

English Language Abstract of JP 6-137857.

(Continued)

*Primary Examiner*—R. A. Smith
(74) *Attorney, Agent, or Firm*—Greenblum & Bernstein, P.L.C.

(57) ABSTRACT

A surveying apparatus is provided that includes a sighting telescope, an imaging device, and an external orientation parameter calculator. The sighting telescope is rotatable about a horizontal axis and a vertical axis. The imaging device is integrally rotated with the sighting telescope and the imaging device has an optical axis that is different from the collimation axis. The external orientation parameter calculator calculates external orientation parameters of stereo images that are obtained by the imaging device in an erecting observation and in an inverse observation in terms of the position of the optical axis with respect to the collimation axis, and the sighting directions in the erection observation and in the inverse observation.

5 Claims, 5 Drawing Sheets

FOREIGN PATENT DOCUMENTS

JP        2008014653 A   *   1/2008
JP        2008116384 A   *   5/2008

OTHER PUBLICATIONS

English Language Abstract of JP 11-337336.

U.S. Appl. No. 11/772,331 to Matsuo et al., which was filed on Jul. 2, 2007.
U.S. Appl. No. 11/772,369 to Matsuo et al., which was filed on Jul. 2, 2007.
U.S. Appl. No. 11/772,431 to Matsuo et al., which was filed on Jul. 2, 2007.

* cited by examiner

ERECTING OBSERVATION

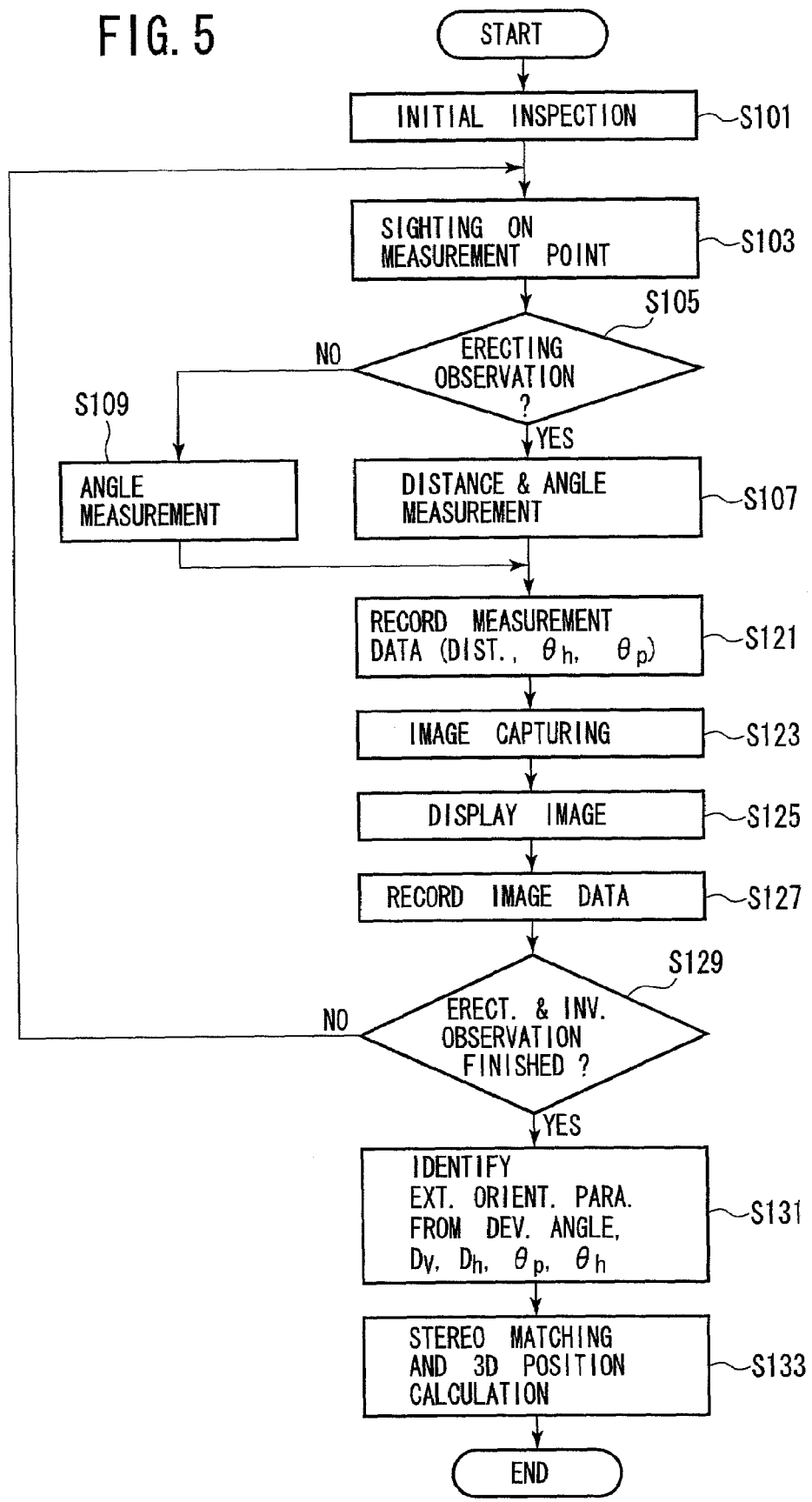

US 7,503,123 B2

SURVEYING APPARATUS

BACKGROUND OF THE INVENTION

1. Field of the Invention

The present invention relates to a surveying apparatus provided with a camera for capturing an image in a surveying field.

2. Description of the Related Art

Conventionally, the image of an area surrounding a measurement point is often photographed and recorded with its measurement data. The image of the surveying area is generally obtained by a normal camera. Further, in Japanese Unexamined Patent Publication (KOKAI) No. 11-337336, an image including the measurement point is obtained for each measurement point by an imaging device mounted inside the surveying apparatus.

SUMMARY OF THE INVENTION

However, when referring to the images of a scene including the measurement point some time after the surveying, although one can determine the position of the measurement point from the measurement data, the relative positions of features in the captured image around the measurement point may not be easily determined. In some cases, even whether or not a feature exists nearer or farther in the field than the measurement point may not be easily identified. Therefore, in such an occasion, when a user needs to know the positional relationship of the features in the captured image around the measurement point with respect to the measurement point, it is necessary to revisit the surveying field.

Therefore, an object of the present invention is to provide a surveying apparatus that captures stereo images of the area surrounding a measurement point and that is able to calculate the external orientation parameters of the stereo images.

According to the present invention, the surveying apparatus provided includes a sighting telescope, an imaging device, and an external orientation parameter calculator. The sighting telescope is rotatable about a horizontal axis and a vertical axis. The imaging device is integrally rotated with the sighting telescope and the imaging device has an optical axis that is different from the collimation axis. The external orientation parameter calculator calculates the external orientation parameters of stereo images that are obtained by the imaging device in an erecting observation and in an inverse observation from the position of the optical axis with respect to the collimation axis and the sighting directions in the erection observation and in the inverse observation.

BRIEF DESCRIPTION OF THE DRAWINGS

The objects and advantages of the present invention will be better understood from the following description, with reference to the accompanying drawings in which:

FIG. 5 is a flowchart of the surveying procedures including operations for capturing the stereo images, including the measurement point.

DESCRIPTION OF THE PREFERRED EMBODIMENTS

Figure 1:
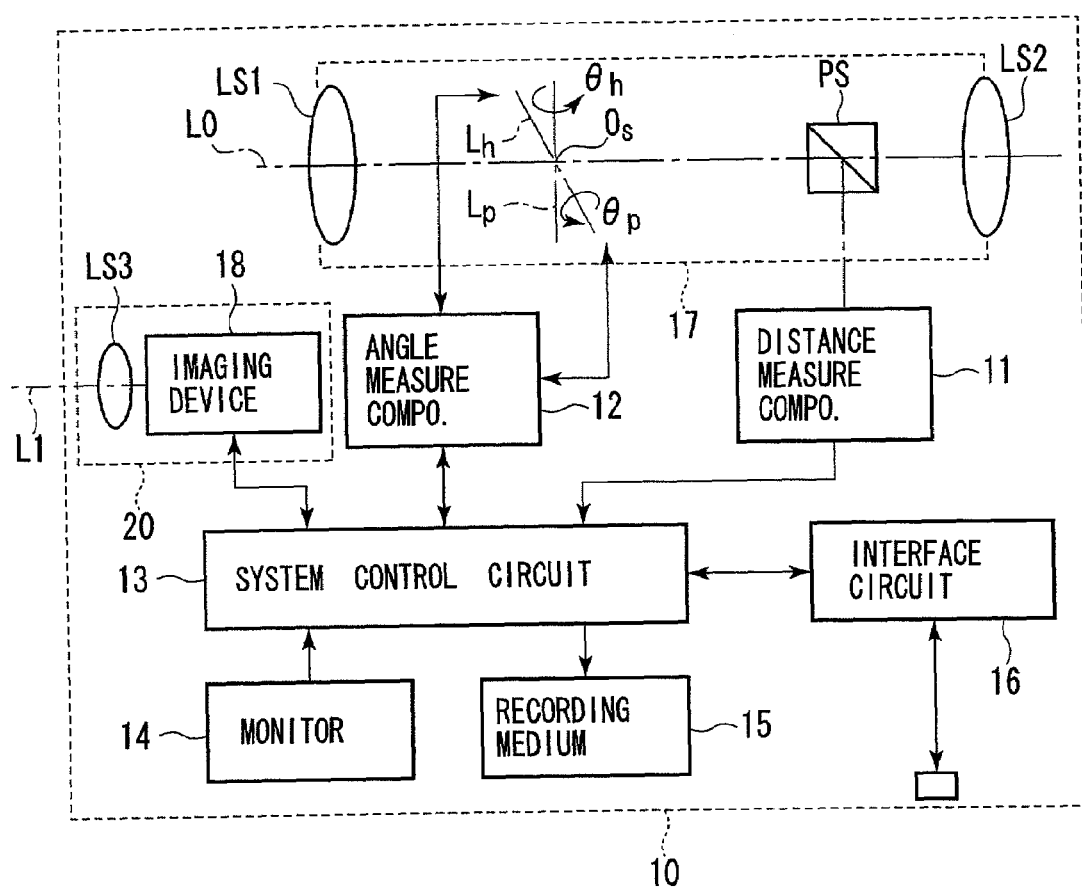
FIG. 1 is a block diagram of the surveying apparatus as provided with a digital camera, to which an embodiment of the present invention is applied.

The present invention is described below with reference to the embodiments shown in the drawings.

Figure 2:
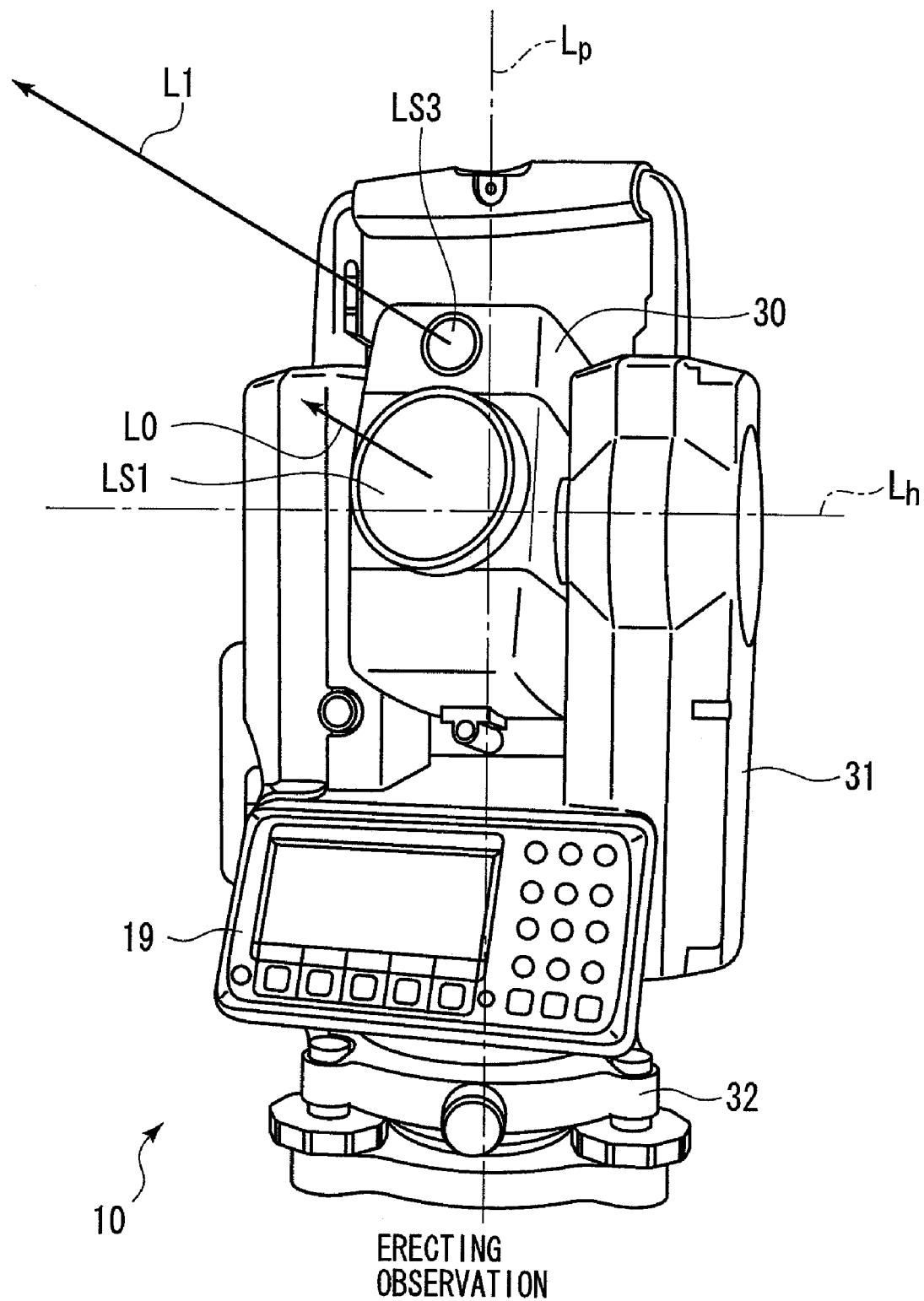
FIG. 2 is a perspective view showing the appearance of the surveying apparatus of the embodiment.

FIG. 1 is a block diagram of a surveying apparatus provided with a digital camera, to which an embodiment of the present invention is applied. FIG. 2 is a perspective view showing the appearance of the surveying apparatus of the embodiment. With reference to FIGS. 1 and 2, the structures of the surveying apparatus of the present embodiment will be described below.

The surveying apparatus 10 can be any type as long as it is rotatable by more than 180 degrees on both horizontal and perpendicular axes, such as a total station, a theodolite, etc. However, in the following descriptions, a total station will be chosen as an exemplary of the surveying apparatus 10.

The surveying apparatus 10 has a sighting telescope 17 for an operator to sight a measurement point. The sighting telescope 17 has a horizontal axis Lh for measuring a vertical angle (an altitude) θp, and a vertical axis Lp for measuring a horizontal angle θh, so that the sighting telescope 17 is rotatable about the horizontal axis Lh and the vertical axis Lp, and is provided on a rotational portion 30. Both sides of the rotational portion 30 are rotatably supported by the body 31 of the surveying apparatus 10 about the horizontal axis Lh. Further, the body 31 is placed on a pedestal 32 and rotatably supported about the vertical axis Lp.

Note that the surveying apparatus can be also structured such as the rotational portion 30 is rotatably supported about the vertical axis Lp by the body 31 and the body 31 is rotatably supported about the horizontal axis Lh with respect to the pedestal 32.

The horizontal axis Lh and the vertical axis Lp perpendicularly intersect at a point $O_s$ (referred to as the sighting origin $O_s$ in the following) and the optical axis L0 (or collimation axis) of the sighting telescope 17 passes through the sighting origin $O_s$. The optical axis L0 of an objective lens system LS1 is bifurcated by a prism PS, for example, so that one of the bifurcated optical axes reaches an eyepiece lens system LS2 and the other reaches a distance measurement component 11. The distance measurement component 11 detects an oblique distance to a measurement point (which is sighted) by using a phase modulation measurement method, a pulse laser method, or the like, while an angle measurement component 12 detects the vertical angle θp and the horizontal angle θh.

The distance measurement component 11 and the angle measurement component 12 are connected to a system control circuit 13, whereby they are controlled by signals from the system control circuit 13. For example, the distance measurement component 11 detects a distance in accordance with signals from the system control circuit 13, and outputs the detected data or measurement data to the system control circuit 13.

On the other hand, the angle measurement component 12 continuously detects angles at regular time intervals, and outputs the detected data or measurement data to the system control circuit 13 when it is required. The detected data, such as oblique distance, horizontal angle, and vertical angle, are processed in the system control circuit 13.

Further, a digital camera 20 is integrally provided inside the rotational portion 30 of the surveying apparatus 10. The digital camera 20 is provided with an imaging portion 18, including a photographing lens system LS3, and an imaging device, such as a CCD. The optical axis of the photographing lens system LS3 is arranged to be parallel with the collimation axis L0 of the sighting telescope 17, so that the imaging portion 18 is able to capture an image in the sighting direction through the photographing lens LS3. Image data obtained by the imaging device 18 is transmitted to the system control circuit 13 and displayed on a monitor 14. Further, the image data can also be recorded onto a detachable recording medium 15, such as an IC card, etc.

The system control circuit 13 is also connected to switches and an indicating device (e.g. LCD) provided on an operating panel 19. Further, an interface circuit 16 is connected to the system control circuit 13, whereby the measurement data and the image data can be output to external devices, such as a data collector (not shown) or a computer (not shown), via the interface circuit 16.

Figure 3:
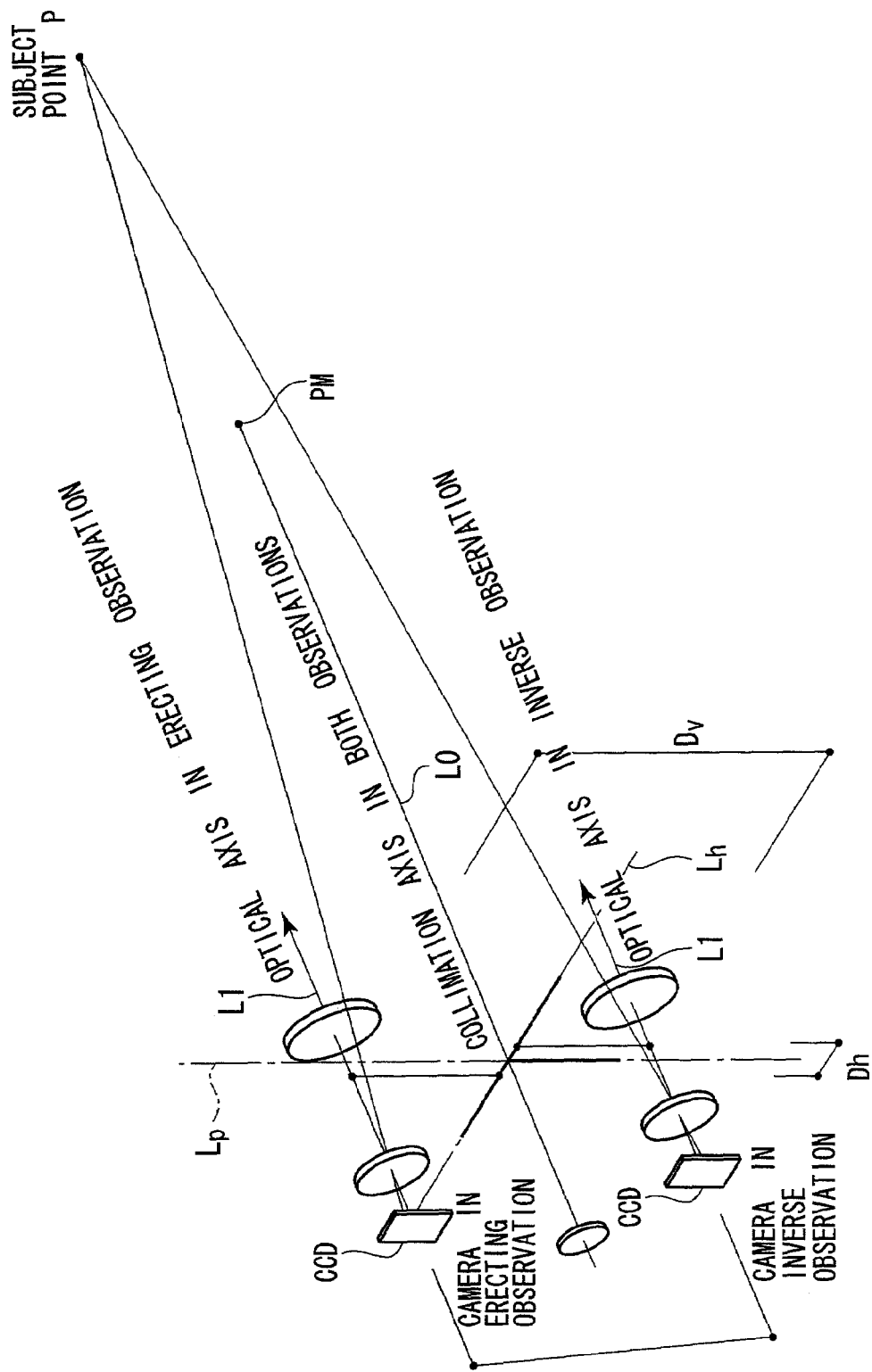
FIG. 3 schematically illustrates the principle of the stereo image capturing method to which the digital camera of the surveying apparatus is applied.

Referring to FIG. 3, a stereo image capturing method to capture a pair of stereo images about the measurement point in the present embodiment is explained. FIG. 3 schematically illustrates the principle of the stereo image capturing method to which the digital camera 20 of the surveying apparatus 10 is applied.

Figure 4:
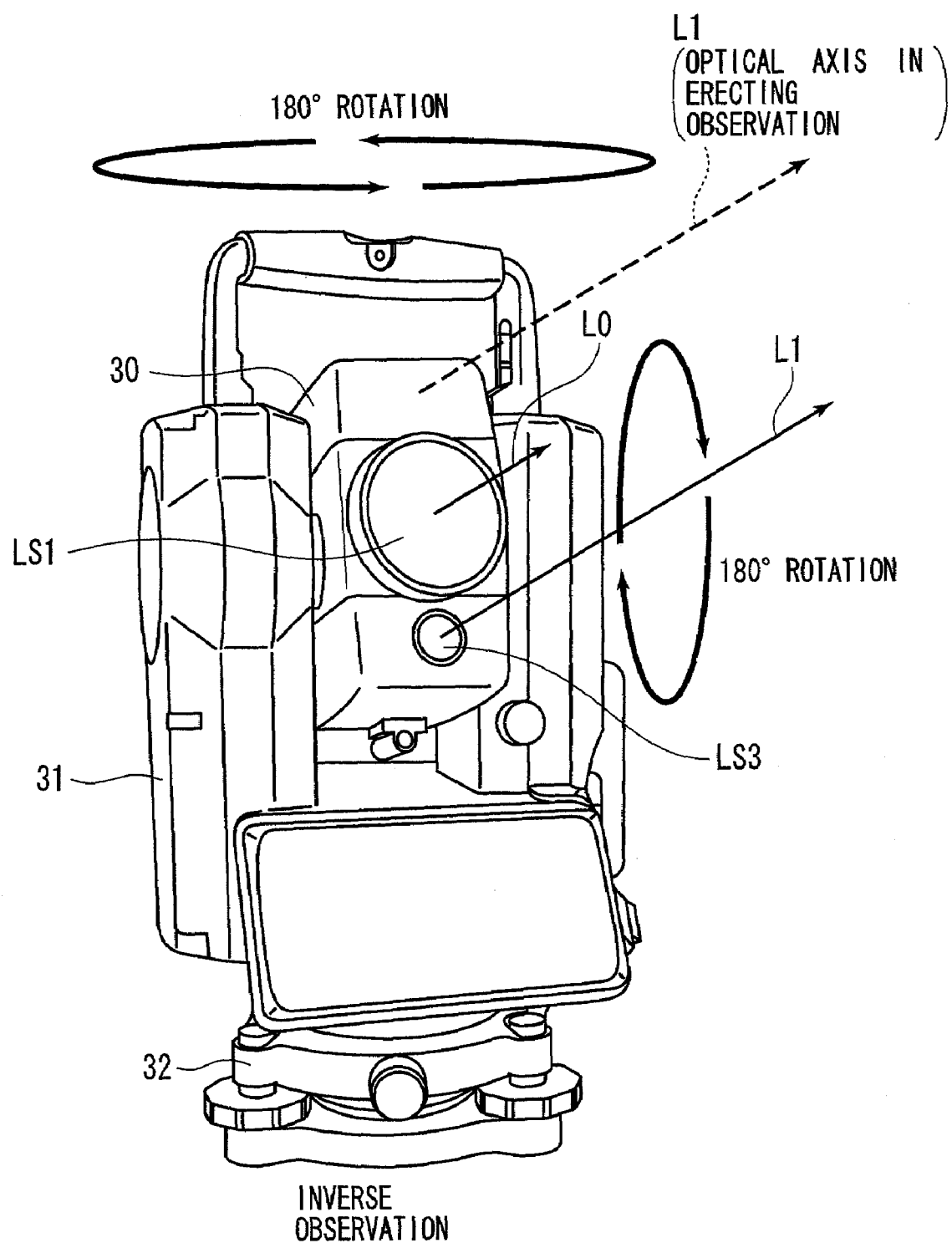
FIG. 4 illustrates a perspective view of the surveying apparatus in the inverse observation position.

In the present embodiment, a measurement point PM is sighted by the surveying apparatus 10 in the erecting observation position and the view including the measurement point PM is captured by the digital camera 20 as a first image. In turn, the sighting telescope and the digital camera 20 are rotated 180 degrees about both of the horizontal axis Lh and the vertical axis Lp, whereby the measurement point MP is sighted in the inverse observation position, and the view including the measurement point PM is captured by the digital camera 20 as a second image. In FIG. 4, a perspective view of the surveying apparatus 10 in the inverse observation position is illustrated (note that FIG. 2 illustrates the perspective view in the erecting observation position).

The optical axis L1 of the digital camera 20 provided inside the surveying apparatus 10 is parallel but not coaxial with the collimation axis L0, so that there is a displacement between the optical axis L1 and the collimation axis L0. In FIG. 3, the displacement in the vertical and the horizontal directions is represented by values Dv and Dh. Therefore, the positions of the optical axis L1 in the erecting observation position and the inverse observation position are different from each other. Thereby, the first image and the second image are regarded as a pair of stereo images, which are photographed from two different viewpoints.

Further, the position of the digital camera 20 with respect to the sighting telescope 17 is known, so the positions of the digital camera 20 in the erecting observation position and the inverse observation position can be calculated by the surveying apparatus 10. Consequently, the external orientation parameters of the stereo images (the positions of the camera and the directions of the optical axis) are readily obtained.

With reference to the flowchart in FIG. 5, the surveying procedures, including operations for capturing the stereo images including the measurement point, using the surveying device 10 of the present embodiment, is explained. As an example, the stereo image-capturing mode is selected in order to perform the stereo image capturing in the surveying.

In Step S101, an initial inspection is carried out. For example, the deviation angle of the optical axis L1 of the digital camera 20 with respect to the collimation axis L0 of the sighting telescope 17 is detected and its data is recorded. In Step S103, the sighting telescope 17 is aimed at the measurement point PM, i.e., the measurement object, by an operator.

In Step S105, whether the sighting telescope 17 is used in the erecting observation position, is determined. If it is determined that the sighting telescope 17 is in the erecting observation position, a distance measurement and an angular measurement are carried out in Step S107. The measurement data (the oblique distance, the vertical angle θp, and the horizontal angle θh) of the measurement point PM is, for example, recorded in the recording medium 15 in Step S121.

Conversely, if it is determined in Step S105 that the sighting telescope 17 is not in the erecting observation position (i.e., in the inverse observation position), only an angular measurement is carried out in Step S109, and in Step S121 the measurement data, such as the vertical angle θp and the horizontal angle θh, are, for example, recorded in the recording medium 15.

In Step S123, a view in the sighting direction, such as an image of the periphery of the measurement point PM, is captured by the imaging device 18 of the digital camera 20, and the captured image is displayed on the monitor 14 in Step S125. Further, in Step S127, the image data of the image displayed on the monitor 14 is, for example, recorded in the recording medium 15.

In Step S129, whether both the erecting observation and the inverse observation, using the sighting telescope 17, have been completed, is determined. If it is determined that either of the observations has not been completed (e.g., only the erecting observation has been completed), the process returns to Step S103, so that the sighting telescope 17 is rotated 180 degrees about the horizontal axis Lh and the vertical axis Lp, respectively, and the same processes are repeated to perform the inverse observation. Thereby, the first image and the second image, each corresponding to the erecting observation and the inverse observation, respectively, are captured and recorded in the recording medium 15.

If it is determined in Step S129 that the erecting observation and the inverse observation have both been completed, the process proceeds to Step S131 and the external orientation parameters of the first image and the second image are identified. Namely, the external orientation parameters are calculated by the system control circuit 13 from the deviation angle of the optical axis L1 of the photographing optical system from the collimation axis L0 (which is obtained in the initial inspection), the displacement values Dv and Dh of the optical axis L1 of the photographing optical system with respect to the collimation axis L0 (which are previously given and recorded in a memory device, such as a ROM (not shown)), and the vertical angles θp and the horizontal angles θh obtained in the erection observation position and the inverse observation position. Further, the external orientation parameters are recorded in the recording medium 15.

For example, the external orientation parameters are recorded in connection with the image data of the first and second images (the stereo image data). Further, the image data of the first and second images is recorded in connection with the measurement data for the measurement point. These relationships may be established by giving correspondent file names to respective data files or adding information to the header area of the files.

In Step S133, a stereo matching process is carried out and the three-dimensional coordinates of a point P (see FIG. 3) that is arbitrarily designated in the first image or the second image are calculated according to the principle of analytical photogrammetry by using the external orientation parameters obtained in Step S131, and in turn, this procedure ends.

Note that the process of Step S133 is preferably performed in a computer system by forwarding the measurement data, the image data of the first and second images, and the external orientation parameters thereto via the interface circuit 16. Further, when errors are small or required accuracy is low, compensation based on the deviation angle is not required.

As described above, according to the present embodiment, a pair of stereo images surrounding a measurement point is readily obtained and their external orientation parameters are calculated therefrom by the surveying apparatus, thus the position of an arbitrary point within the stereo image with respect to the measurement point can be easily obtained afterward.

Although the embodiment of the present invention have been described herein with reference to the accompanying drawings, obviously many modifications and changes may be made by those skilled in this art without departing from the scope of the invention.

The present disclosure relates to subject matter contained in Japanese Patent Application No. 2006-183301 (filed on Jul. 3, 2006) which is expressly incorporated herein, by reference, in its entirety.

The invention claimed is:

1. A surveying apparatus comprising:

a sighting telescope that is rotatable about a horizontal axis and a vertical axis;

an imaging device that is integrally rotated with said sighting telescope and has an optical axis that is different from the collimation axis; and an external orientation parameter calculator that calculates external orientation parameters of stereo images that are obtained by said imaging device in an erecting observation and in an inverse observation in terms of the position of said optical axis with respect to said collimation axis, and the sighting directions in the erection observation and in the inverse observation.

2. The apparatus according to claim 1, wherein said optical axis is substantially parallel to said collimation axis.

3. The apparatus according to claim 1, further comprising a recording medium that stores a deviation angle of said optical axis from said collimation axis, and wherein said external orientation parameter calculator calculates the external orientation parameters based on the deviation angle.

4. The apparatus according to claim 1, wherein image data of the stereo images and the external orientation parameters are stored in a recording medium with information relating each other.

5. The apparatus according to claim 4, wherein the image data of the stereo images and a measurement data are stored in the recording medium with information relating each other.

* * * * *